Nov. 22, 1927.

N. R. THIBERT 1,649,875

DETACHABLE FASTENER FOR NUMBER PLATES AND THE LIKE

Filed Dec. 16, 1926 2 Sheets-Sheet 1

Inventor
Napoleon R. Thibert
By Attorneys

Nov. 22, 1927.  1,649,875
N. R. THIBERT
DETACHABLE FASTENER FOR NUMBER PLATES AND THE LIKE
Filed Dec. 16, 1926   2 Sheets-Sheet 2

Inventor
Napoleon R. Thibert
By Attorneys
Southgate Fay & Hawley

Patented Nov. 22, 1927.

1,649,875

UNITED STATES PATENT OFFICE.

NAPOLEON R. THIBERT, OF WORCESTER, MASSACHUSETTS, ASSIGNOR TO THE LOCK-EM-ALL MFG. CO., OF WORCESTER, MASSACHUSETTS.

DETACHABLE FASTENER FOR NUMBER PLATES AND THE LIKE.

Application filed December 16, 1926. Serial No. 155,252.

This invention relates to a device by which number plates can be attached to, and detached very readily from, the brackets of automobiles and is designed especially for use in sales rooms and garages. It is capable of general use, however.

The principal objects of the invention are to provide a device for the above mentioned purposes in which the part that is moved in from the front or face side of the number plate or the like will not have to be turned and in which a head or fastening member is applied on the rear of the number plate and is easily turned one quarter around and then released to fasten the device in position and secure it against turning and accidental detachment by utilizing the features present in the bracket on a car; and to provide the detachable fastening device with means cooperating with the end of the element on the front of the plate for assisting in preventing accidental displacement of the same after it is applied.

Other objects and advantages of the invention will appear hereinafter.

Reference is to be had to the accompanying drawings in which

Figure 1:
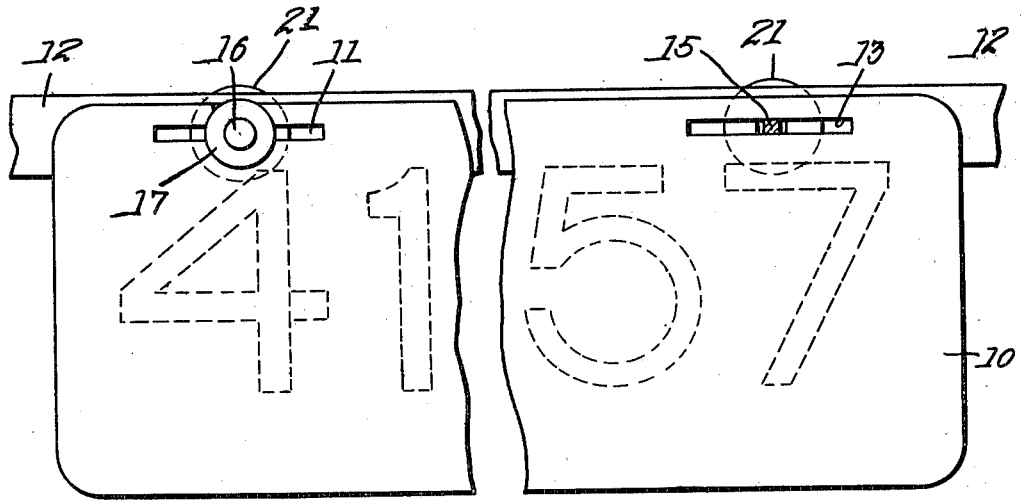
Fig. 1 is a front view of a front number plate of an automobile with a fastening device constructed in accordance with this invention.
Figure 2:
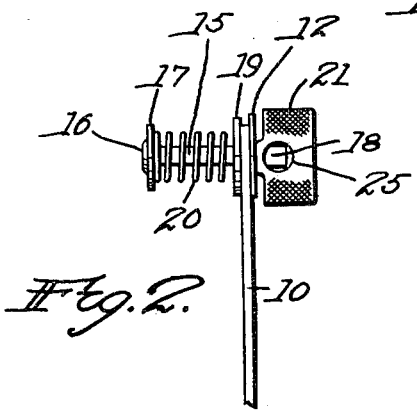
Fig. 2 is an end view of the plate and a side view of the complete fastening device in its final position.
Figure 3:
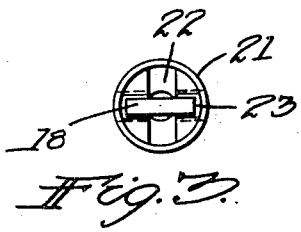
Fig. 3 is an end view of the detachable member thereof on the back of the plate.

As is well understood, the number plate 10 of an automobile is provided with two slots 11 for receiving the fastening device and the bracket 12 to which it is secured is provided with two longitudinal slots 13 adapted to register with the two slots so as to provide for the reception of the fastening bolts that are usually used to attach the plates permanently. In garages and selling agencies the dealers' number plates have to be shifted around from one car to another frequently. This involves the use of a screw driver or monkey wrench and the unscrewing of the nuts all the way off the two screws and the process is repeated in the reverse order when applying the plate to another car. By this invention there is no danger of the plates becoming detached accidentally but they can be removed by simply turning one member one quarter way around and applying pressure to it and they can be attached in the same way.

The fastening device comprises two parts. First a member to go on the outer side of the plate 10 which comprises a stud 15 of flat form on two or four sides. This stud is provided with a head 16 and a washer 17 on it. This washer can be secured firmly in position or merely have a passage through it shaped like the stud 15. At the opposite end of the stud 15 is a cross bar 18 integral with the stud and under this is located a washer 19 which is free to slide on the stud. Between the two washers 17 and 19 is a coil spring 20 which normally holds the washer 19 against the cross bar 18. This constitutes the whole of this element of the fastening device. It is intended to be applied to the number plate when it is in position with the slots 11 and 13 in registration. The cross bar is arranged in line with these slots and is pushed in so that the cross bar comes beyond the back of the bracket.

It is fastened in place by the use of the other member of the fastening device which I call a head 21. This head is of circular, oval, or any desired shape and is provided with a slot 22 across it for receiving the cross bar 18. It is of cup shape and the slot 22 extends clear through the bottom of it so the cross bar can be forced in through the interior of the cup when the two parts of the fastening device are placed on the opposite sides of the plate and bracket. They are secured in position by the turning of the cup-shaped head 21 a quarter of a revolution. This can be done without turning the cross bar 18 provided the spring 20 is compressed enough to allow the cross bar to pass in beyond the bottom wall of the cup-shaped head.

The cup-shaped head also is provided with a groove 23 perpendicular to the slot 22 for receiving the ends of the cross bar when the head has been turned a quarter of a revolution. Thus the cross bar is prevented from turning accidentally and also the head is held in this position. On the outer side of the bottom of the head is a rib 24 parallel with the groove 23 adapted to engage in the slot 13 and thus further assist in preventing the accidental rotation and displacement of the two parts of the fastening device. The groove 23 can be made in any desired way but I have shown two holes 25 in the side of the head 21 formed by boring through the head from one side to the other, leaving these two holes and the groove 23.

Figure 5:
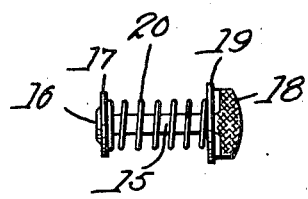
Fig. 5 is a side view of the other part of the fastening device.
Figure 4:
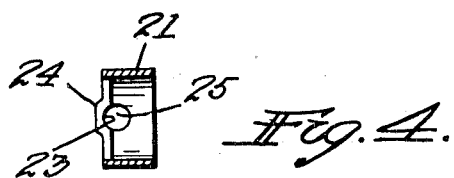
Fig. 4 is a transverse sectional view of the head.
Figure 6:
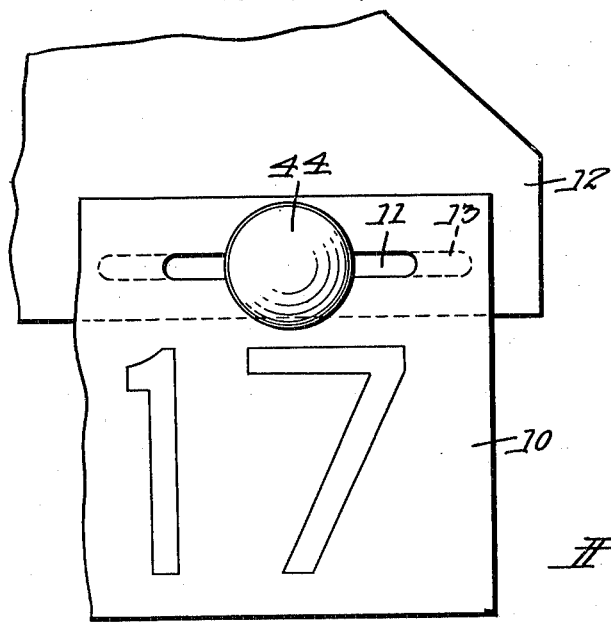
Figs. 6, 7, 8 and 9 are very similar to Figs. 1, 2, 3 and 4 respectively showing a modification.
Figure 7:
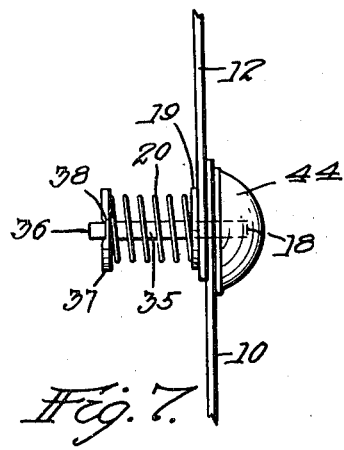
Figure 10:
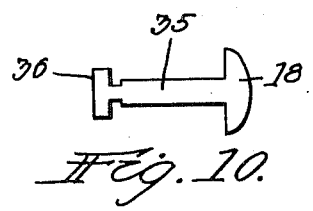
Fig. 10 is a side view of the stud.
Figures 8, 9:
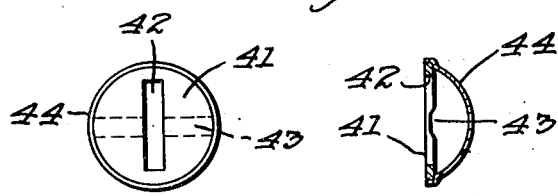
Figure 11:
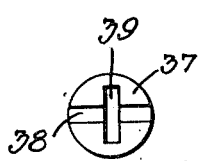
Fig. 11 is a view of the bottom of the washer.

The operation of the device has been described but I will state it briefly again. The stud 15 with the parts thereon shown in Fig. 5 is pushed into the slot 11 and forced far enough in so that the cross bar 18 projects materially beyond the back of the bracket 12. The head 21 is then applied in either one of the two positions to which it is limited by the slot 22. The bottom of this cup-shaped member is thus located under the ends of the cross bar 18. Now the cup is turned 90 degrees to bring the grooves 23 around in registration with the cross bar 18 and the pressure is released from the parts. The spring holds them together in this position and firmly holds the number plate in position. It is not likely to be displaced by any ordinary accident on account of the grooves and connections above mentioned. The stud 15 cannot turn in the slots 11.

When it is desired to take off the number plate the operator presses in on the stud 15 until the cross bar 18 is lifted out of the groove 23 and then turns the head 90 degrees in either direction. This releases the parts and they can be removed with the plates. This is a very simple operation because when applying the pressure, it is applied from the head of the stud 15 on the outside and the cup-shaped head 21 is merely put into position and turned without pressure. This constitutes a very simple means for temporarily holding number plates and preventing their accidental detachment.

In the form shown on the second sheet of drawings, the invention is simplified by the use of a stud 35 having the head 18 but with a T-shaped projection 36 at the other end. Preferably this is a square stud. The spring 20 is used and the stud is turned around the other way so that the spring appears on the back of the plate 10 and bracket 12. The washer 37 is provided with a groove 38 on the back and perforation 39 at right angles thereto. The end 36 can be inserted through the perforation in the washer and the washer turned so that this head will lie in the groove.

On the other end and on the front of the number plate 10 is a flat plate 41 having also a slot 42 and a groove 43 at right angles, the groove being on the front side. The head 18 is put through the slot, the spring compressed and the plate 41 turned. I prefer to protect this plate by a cap 44 of sheet metal which is shrunk or otherwise fastened around the plate and furnishes a means for covering up the construction of the interior.

The device in this case is applied by assembling it, except the plate 41 and cap 44, on the rear and pushing the head 18 through the slots 11 and 13 and through the slot 42 in the plate 41. Then the plate 41 is turned by its cap 44 to the fastening position. The cap has to be turned and the spring pressed in to release it. The above named advantages are also secured by this arrangement.

Although I have illustrated and described only two forms of the invention I am aware of the fact that other modifications can be made therein by any person skilled in the art without departing from the scope of the invention as expressed in the claims. Therefore, I do not wish to be limited to all the details of construction herein shown and described, but what I do claim is:—

1. In a fastening device for the purpose described, the combination of a stud having a cross bar at its end adapted to enter a slot in a plate, said stud having a washer thereon with a spring behind it for forcing the washer against the rear of the plate, with a hollow head having a substantial wall projecting therefrom by which the head can be turned, adapted to be mounted on the other side of the plate having a bottom provided with a slot for the cross bar and adapted to be turned to lock the cross bar in its position, said head having a transverse groove on the inner side of its bottom for receiving the ends of the cross bar after it is turned.

2. In a fastening device for the purpose described, the combination with a non-circular stud having an integral cross bar at its end adapted to enter a slot in a plate, said stud having a washer thereon fitting the stud and non-rotatable, and a spring behind it for forcing the washer against the plate, of a hollow head mounted on the other side of the plate having a bottom provided with a slot for the cross bar and adapted to be turned to lock the cross bar in its position, said head having a transverse rib parallel on the outer surface of its bottom for engaging in a slot in the plate or bracket to which it is applied.

3. In a fastening device for the purpose described, the combination with a stud having an integral cross bar at its end adapted to enter a slot in a plate, said stud having a washer thereon with a spring behind it for forcing the washer against the plate, of a hollow head mounted on the other side of the plate having a bottom provided with a slot for the cross bar and adapted to be turned to lock the cross bar in its position, said head having a transverse groove on the inner side of its bottom for receiving the ends of the cross bar after it is turned and being provided on the outer side of its bottom with a transverse rib parallel with said groove for engaging in a slot in the plate or bracket to which it is applied.

4. As an article of manufacture, a holding device for a fastening stud, said holding device comprising a hollow head consisting of one integral member provided with a bottom, the bottom having a slot for receiving a cross bar on the stud and a groove in the bottom on the inside at right angles to said slot, whereby when the head is turned the cross bar will be located in said groove, said head also having a rib on the outer side of its bottom parallel with said groove for engaging in a slot in the plate or bracket to which it is to be applied.

In testimony whereof I have hereunto affixed my signature.

NAPOLEON R. THIBERT.